(12) United States Patent
Eversole

(10) Patent No.: US 12,342,788 B2
(45) Date of Patent: Jul. 1, 2025

(54) CONSTANT SPEED STRAP DRIVE CONTROL UNIT

(71) Applicant: The GSI Group LLC, Assumption, IL (US)

(72) Inventor: Brad K. Eversole, Assumption, IL (US)

(73) Assignee: The GSI Group, LLC, Assumption, IL (US)

( * ) Notice: Subject to any disclaimer, the term of this patent is extended or adjusted under 35 U.S.C. 154(b) by 540 days.

(21) Appl. No.: 17/756,331

(22) PCT Filed: Oct. 16, 2020

(86) PCT No.: PCT/IB2020/059748
§ 371 (c)(1),
(2) Date: May 23, 2022

(87) PCT Pub. No.: WO2021/105786
PCT Pub. Date: Jun. 3, 2021

(65) Prior Publication Data
US 2022/0400646 A1    Dec. 22, 2022

Related U.S. Application Data

(60) Provisional application No. 62/939,838, filed on Nov. 25, 2019.

(51) Int. Cl.
*A01K 1/00* (2006.01)
*F16H 19/06* (2006.01)
*F24F 13/14* (2006.01)

(52) U.S. Cl.
CPC ........... *A01K 1/0047* (2013.01); *F16H 19/06* (2013.01); *F24F 2013/1433* (2013.01)

(58) Field of Classification Search
CPC ............ A01K 1/0047; A01K 89/01083; A01K 89/0175; A01K 89/06; A01K 89/017;
(Continued)

(56) References Cited

U.S. PATENT DOCUMENTS 6,481,156 B1 *  11/2002  Richmond ............. A01K 1/034
                                                  49/24
6,871,842 B2 *   3/2005  Sutton ..................... B66D 1/06
                                                 119/493
(Continued)

FOREIGN PATENT DOCUMENTS

AT          334775 B  *  2/1976  .............. E05F 15/71
CN       105776047 A      7/2016
(Continued)

OTHER PUBLICATIONS

Wolf, Johann, AT344775 Translation.pdf, "Verstelleinrichtung Fur Stallfenster", Feb. 1976, pp. 1-2.*
(Continued)

*Primary Examiner* — Avinash A Savani
*Assistant Examiner* — Ryan L Faulkner
(74) *Attorney, Agent, or Firm* — RAY QUINNEY & NEBEKER; Daniel J. Bezdjian

(57) ABSTRACT

A ventilation control system for an animal facility. The ventilation control system has a movable ventilation control member mounted in an opening of the animal facility, the ventilation control member being movable relative the opening to control the amount of air that is able to pass through the opening. The ventilation control system also has a positioning strap attached to the ventilation control member, the strap having a strap thickness. A strap drive control apparatus is configured to control the positioning of the ventilation control member at a constant control member speed.

4 Claims, 7 Drawing Sheets

(58) Field of Classification Search
CPC .... F16H 19/06; F16H 37/16; F16H 2025/481;
F24F 2013/1433; F24F 2013/1446
USPC ........................................................ 454/224
See application file for complete search history.

(56) References Cited

U.S. PATENT DOCUMENTS

2008/0000317 A1\* 1/2008 Patton ..................... F16H 19/06
623/32
2018/0216393 A1\* 8/2018 Brandley ............. E05F 15/627

FOREIGN PATENT DOCUMENTS

| EP | 2471356 A1 | 7/2012 |
|----|------------|--------|
| JP | H09-13840 A2 | 1/1997 |
| JP | 2004124428 A2 | 4/2004 |
| WO | 2005/010313 A1 | 2/2005 |

OTHER PUBLICATIONS

UK Intellectual Property Office, Search report for related UK Application No. GB1917856.5, dated May 29, 2020.
European Patent Office, International Search Report related to International Patent Application No. PCT/IB2020/059748, mail date Jan. 12, 2021.

\* cited by examiner

CONSTANT SPEED STRAP DRIVE CONTROL UNIT

CROSS REFERENCE TO RELATED APPLICATIONS

This application is a National Stage Entry of International Application No. PCT/IB2020/059748, filed Oct. 16, 2020, which claims the benefit of U.S. Provisional Application No. 62/939,838, filed Nov. 25, 2019, which are hereby incorporated by reference in their entireties by this reference.

BACKGROUND OF THE INVENTION

Field of Invention

This invention relates to strap drives used to position a strap used to control movement of an member such as a ventilation shutter that allows the passage of air between the interior and the exterior of a facility, and more particularly to a drive unit that changes the speed of stepper motor based on belt position to provide a constant positioning speed for the ventilation shutter.

Description of Related Art

Maintaining proper conditions for living creatures such as poultry, swine or livestock in large-scale animal buildings is highly desirable in order to sustain healthful life of the animals confined within. A well-controlled environment involves monitoring and regulating the temperature, relative humidity and air quality in the building. For example, properly controlled temperatures enable animals to use feed for growth rather than for body heat. A properly heated animal house results in lower feed costs and increased animal productivity. Additionally, control over the level of humidity in the building is necessary because excess humidity contributes to animal discomfort and promotes the growth of harmful air born bacteria that can cause respiration diseases. Having an elevated humidity level in the animal house may also lead to more frequent changes of bedding and litter which increases production costs.

An important component in maintaining a proper environment in such buildings is providing proper ventilation. Over the years, animal house ventilation systems have improved considerably, thus making possible the high density populations of livestock and poultry in which are often confined in commercial facilities. This is economically important since it reduces production and labor costs.

In a considerable number of poultry raising houses, the ventilated air is controlled by ventilation curtains or doors, which either close the normal ventilation opening in substantially cold weather, or allow the doors to move to a partly open position, allowing ventilation fans to more efficiently circulate air. The ventilated air removes excess heat, moisture, dust, and odors from the building. The circulated air also dilutes airborne disease organisms. If the air is not continuously ventilated in an enclosed poultry house the components of the air changes. The concentration of carbon dioxide, ammonia and other harmful gases may then increase to unacceptable levels.

OVERVIEW OF THE INVENTION

In one embodiment, the invention is directed to a method of operating a track stepper motor to move a strap at a uniform speed. The method includes an initial step of inputting an initial spool diameter D of a spool driven by a stepper motor. A strap thickness of a strap attached to the spool is entered into the controller. A strap configuration of the strap on the spool is entered into the controller. The controller determines an effective spool diameter D' for the strap configuration and an initial position of the strap relative the spool. One or more positionable ventilation control members are attached to the strap. The controller determines an initial stepper motor speed for the stepper motor required to move the one or more ventilation control members at a desired control member speed. The one or more ventilation control members are repositioned by operating the stepper motor at the initial stepper motor speed to rotate the spool. The controller receives an input from the encoder about a new position of the strap. A new effective diameter D' of the spool is calculated using the strap position input from the encoder and the strap thickness. A modified stepper motor speed is determined based on the new effective diameter D' of the spool that would cause the stepper motor to move the one or more control members such that the one or more control members moves uniformly at the desired control member speed. The one or more control members is repositioned at the desired control member speed by operating the stepper motor at the modified stepper motor speed.

Another aspect of the invention is a ventilation control system for an animal facility. The ventilation control system has a movable ventilation control member mounted in an opening of the animal facility, the ventilation control member being movable relative the opening to control the amount of air that is able to pass through the opening. The ventilation control system also has a positioning strap attached to the ventilation control member, the strap having a strap thickness T. A strap drive control apparatus is configured to control the positioning of the ventilation control member at a constant control member speed.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
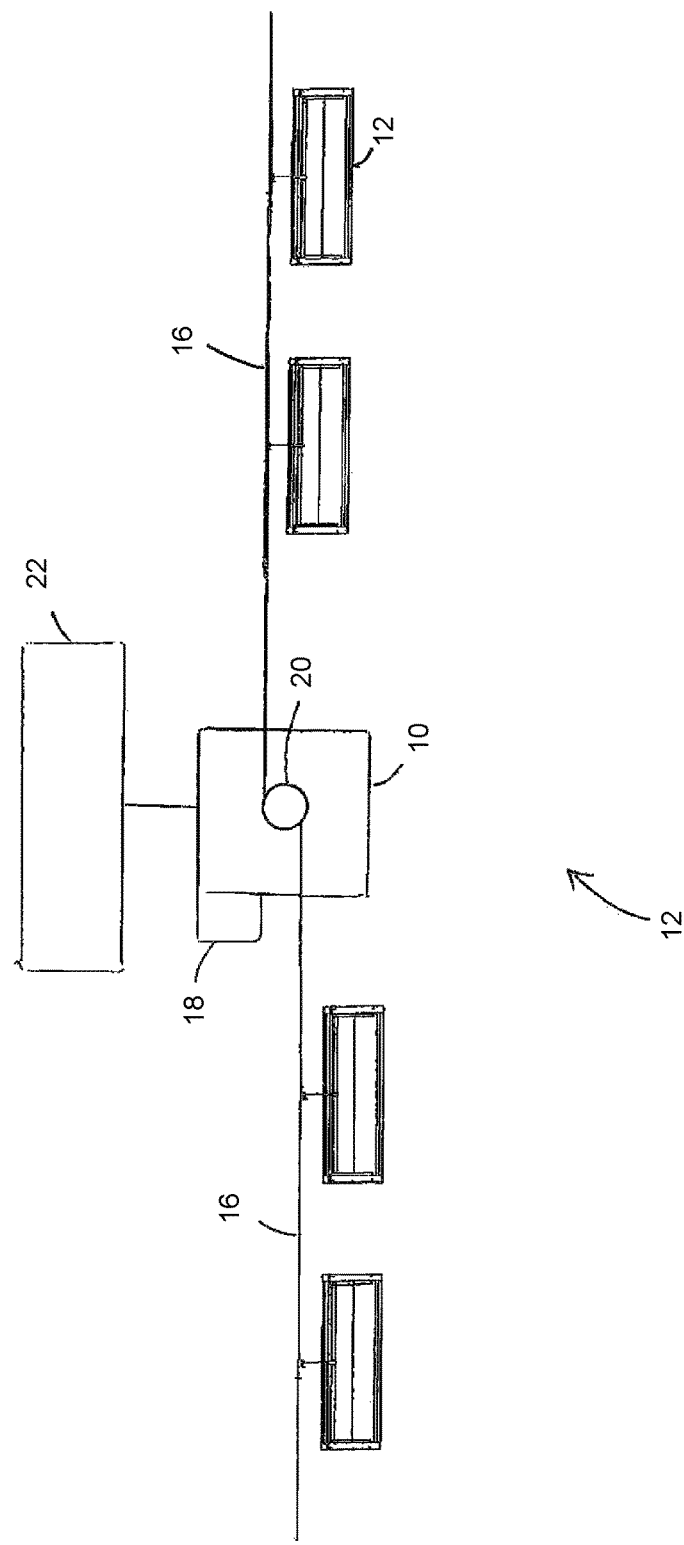
FIG. 1 is a schematic view of an animal facility a plurality of ventilation openings and a strap drive control apparatus used to control providing the ventilation in the facility.

Referring to FIG. 1, a strap drive control apparatus 10 is used to control the positioning of a member 12 in a facility 14. In the illustrated example, the strap drive control apparatus 10 controls ventilation in the facility 14 that is used for housing animals requiring a well ventilated and temperature-controlled environment. The facility 14 may be used to house a wide variety of animals such as chickens, turkeys, hogs or virtually any other animal requiring a relatively controlled temperature environment for adequate growth or production of food such as eggs. As one skilled in the art will understand, the facility 14 includes suitable walls and roof that include a plurality of openings, such as sidewall inlets, ceiling inlets, tunnel doors, etc., through which air may enter or exit the facility 14. Each opening has a movable curtain, shutter, door, or other ventilation control member, broadly member, 12 used to control the amount of air that is able to pass through the opening. For example, a select opening may be covered completely by a curtain ventilation control member 12 disposed thereover which is adapted to be raised (i.e., opened) or lowered (i.e., closed) by a positioning strap 16 controlled by the strap drive control apparatus 10. The strap drive control apparatus 10 uses an electrically driven stepper motor 18 to move the positioning strap 16 by winding or unwinding the strap 16 on a rotating spool 20 controlled by the stepper motor 18. A controller 22 is used to control operation of the stepper motor 18 as will be described more fully below. It will be appreciated by those of ordinary skill in the art that one stepper motor 18 may be used to position multiple ventilation control members 14 or that plural stepper motors 18 may be used for other ones of the plurality of ventilation control members 14, and that such plural stepper motors 18 may be electrically coupled such that those other ventilation control members 14 may be raised and lowered simultaneously or individually by the controller 22. Additionally, while the illustrated example is described as part of a ventilation system for the facility 12, one skilled in the art will understand that the strap drive control apparatus 10 may be used in the positioning of other members used in the facility 14, such as drop feeders and waterers without departing from the scope of the invention.

Figure 2:
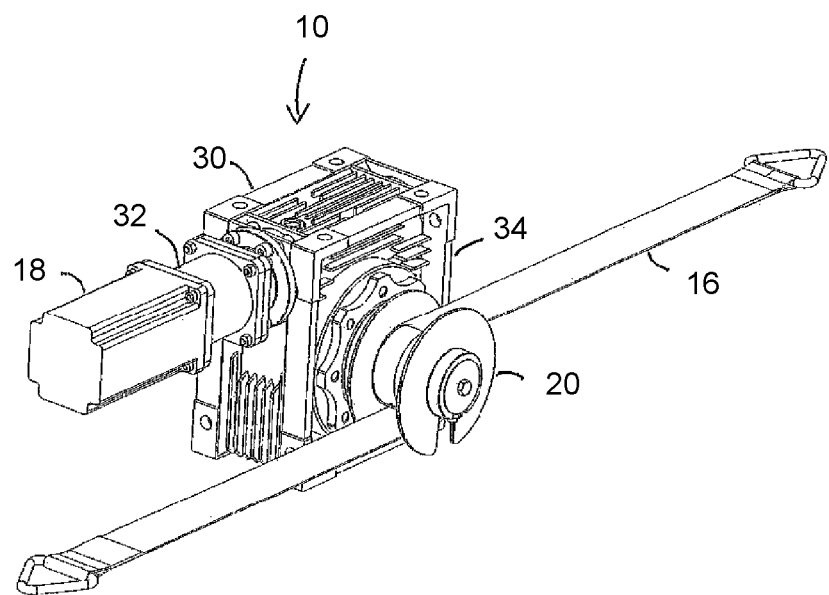
FIG. 2 is a perspective view of the strap drive control apparatus of FIG. 1.
Figure 3:
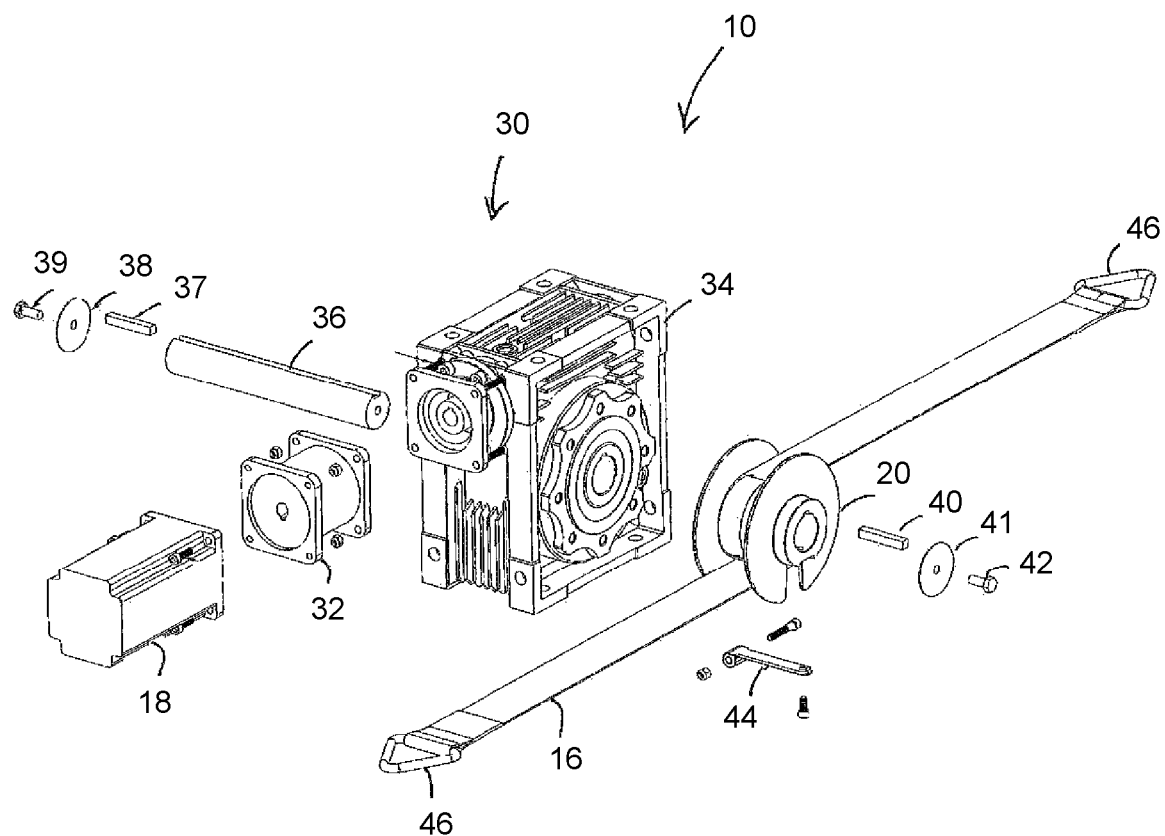
FIG. 3 is an exploded view of the strap drive control apparatus of FIG. 2.

Turning now to FIGS. 2 and 3, the strap drive control apparatus 10 is shown in accordance with one embodiment of the present invention. The strap drive control apparatus 10 has a reducer 30 connected to the stepper motor 18. In one embodiment, the stepper motor 18 may be a single phase 12N-m NEMA 34 stepper motor having a 115/230 VAC input power supply where the rotating speed of the stepper motor is determined by the speed of the pulse frequency (Hz) given to a driver through a pulse generator, and position of the stepper motor is determined according to the number of input pulses. However, one skilled in the art will understand that other suitable stepper motors 18 may be used using sound engineering judgment without departing from the scope of the invention. The reducer 30 may include a suitable planetary gear 32 in combination with a suitable right angle worm gearbox 34. In one exemplary example, the planetary gear 32 has a 5:1 reduction and the right angle worm gearbox 34 has a 60:1 reduction. The reducer 30 drives an output shaft 36 connected to the reducer 30 with suitable square key 37, washer 38 and bolt 39. One skilled in the art will understand that the reducer 30 may be any suitable reducer configured to convert the output speed of the stepper motor 18 to an acceptable driven speed of the output shaft 36 using sound engineering judgment.

The output shaft 36 is connected to the spool 20 such as with a suitable square key 40, washer 41, and bolt 42. The positioning strap 16 is wound around the spool 20 and may be retained on the spool 20 with a suitable retainer 44. In the illustrated embodiment, the spool 20 has a strap 16 extending in both directions from the spool 20. However, the spool 20 may only have a single strap extending therefrom in a single direction. Distal ends and optionally at points periodically along the length of the strap 16 there are attachment mechanisms 46 thereon used to interface the strap 16 with the ventilation control member 12 such that movement of the strap 16 causes the desired movement of the ventilation control member 12 to adjust ventilation in the facility 12 so as to meet desired requirements. The position of the attachment mechanisms 46 is moved by winding or unwinding the strap 16 on the rotating spool 20.

The spool 20 is caused to rotate by the stepper motor 18 under control of the controller 22. The stepper motor 18 includes a rotary encoder 48 to convert the angular position or motion of the shaft to analog or digital output signals. Input from encoder 48 is used to keep track of the position of the strap 16. The encoder 48 provides speed and positioning feedback and desirably determines (and outputs) its circumferential location at all points in time. Rotary encoders 48 used to control stepper motors 18 are well known in the art and need to be described in further detail herein.

Figure 4:
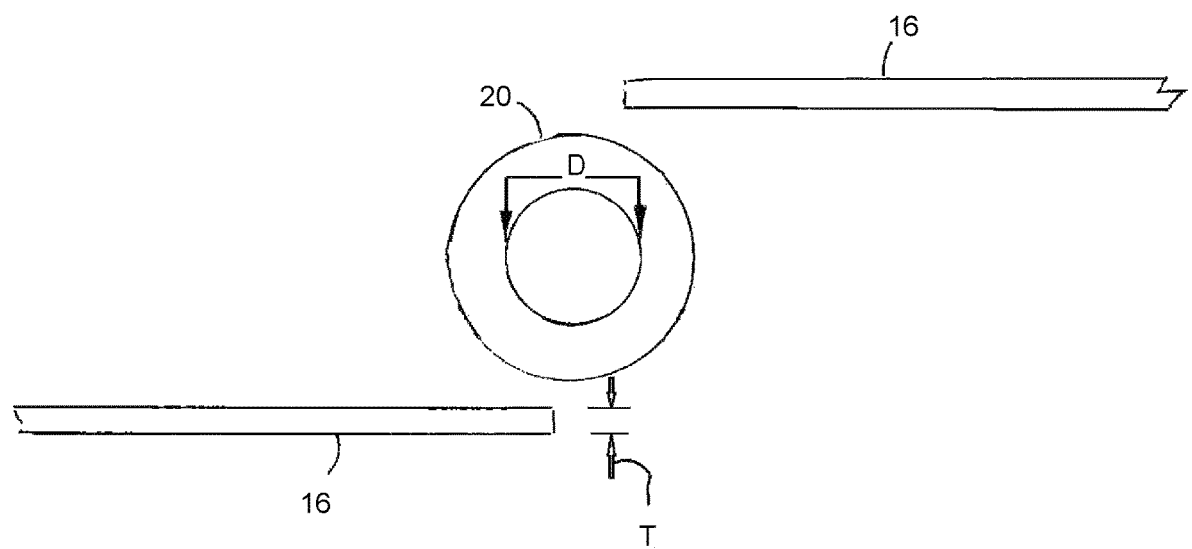
FIG. 4 is a schematic view of the strap of the strap drive control apparatus.

Turning also now to FIG. 4, the strap 16 has a defined thickness T and the spool 20 has a defined diameter D where the strap 16 is to be wound around the spool 20. As the strap 16 is wound on the spool 20, each additional wrap of the strap 16 about the spool 20 increases an effective diameter D' of the spool 20. Accordingly, as the effective diameter D' of the spool 20 changes, each rotation of the spool 20 causes a different length of the strap 16 to be wrapped around the spool 20. As more of the strap 16 is wound around the spool 20, an otherwise constant rotational speed of the spool 20 produced by the stepper motor 18 would have the effect of causing the speed of the strap 16 to become increasingly greater. According to the invention, the controller 22 controls the stepper motor 18 to cause rotation of the spool 20 and thus movement of the strap 16 wound thereon so as maintain an unchanging constant strap speed such that the ventilation control member 12 always moves at a uniform speed.

Figure 5B:
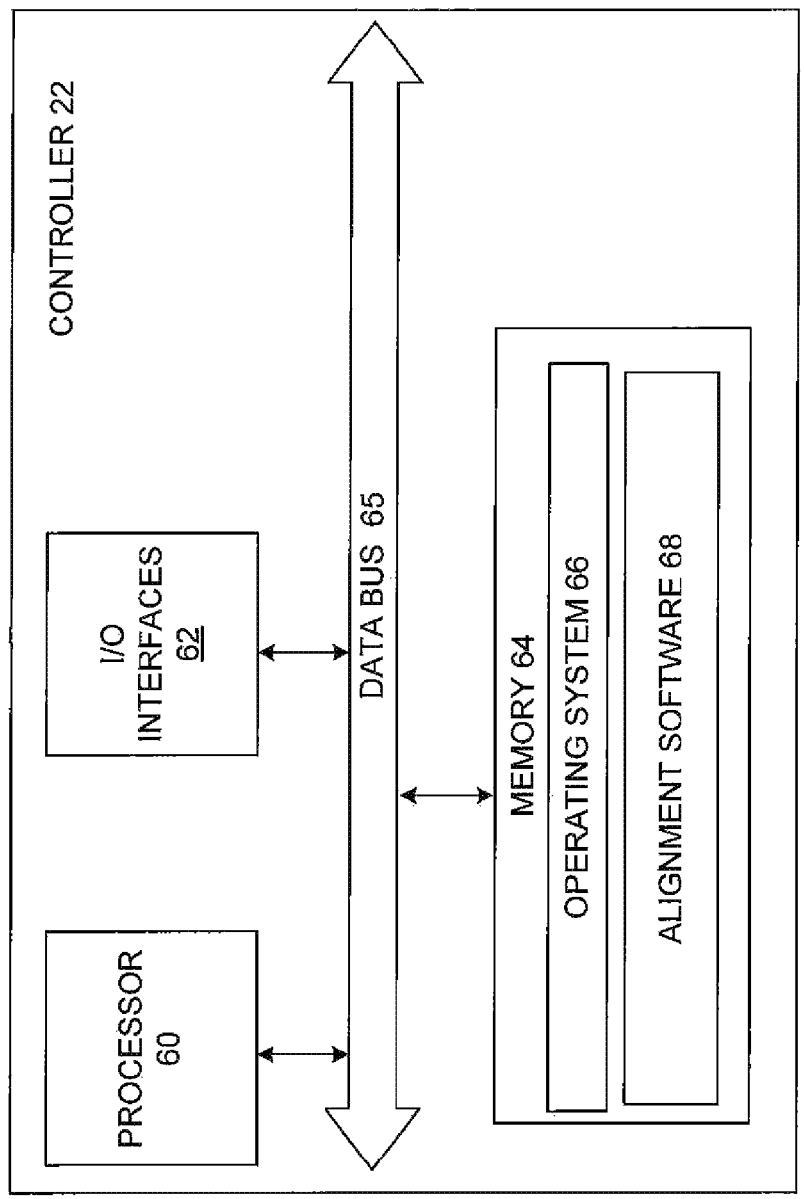
FIG. 5B is a block diagram of an embodiment of an example controller used in the control system of FIG. 5A.
Figure 5A:
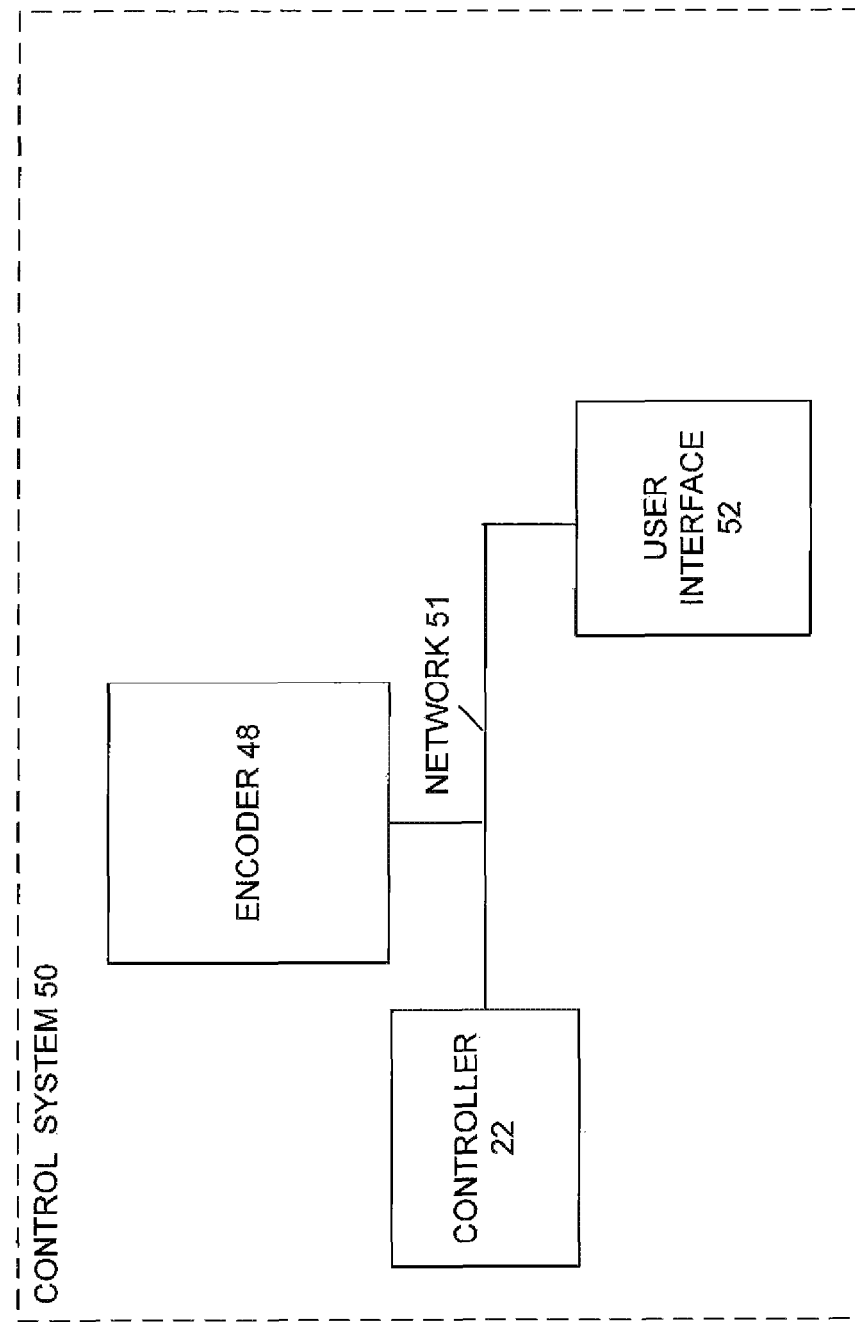
FIG. 5A is a block diagram of an embodiment of an example control system.

Having described an embodiment of an example strap drive control apparatus 10, attention is directed to FIG. 5A, which illustrates an embodiment of an example control system 50 used by the controller 22 for providing control and management of the strap drive control apparatus 10. It should be appreciated within the context of the present disclosure that some embodiments may include additional components or fewer or different components, and that the example depicted in FIG. 5A is merely illustrative of one embodiment among others. Further, though depicted as residing entirely within the facility 14, in some embodiments, the control system 50 may be distributed among several locations. For instance, the functionality of the controller 22 may reside all or at least partly at a remote computing device, such as a server that is coupled to the control system components over one or more wireless networks (e.g., in wireless communication with the strap drive control apparatus 10 via a radio frequency (RF) and/or cellular modems residing in the strap drive control apparatus 10). Further, though depicted using a single controller 22, in some embodiments, the control system 50 may be comprised of plural controllers. In the depicted embodiment, the controller 22 is coupled via one or more networks, such as network 51 (e.g., a CAN network or other network, such as a network in conformance to the ISO 11783 standard, also referred to as "Isobus"), encoder 48, and user interface 52. The user interface 52 may include one or any combination of a keyboard, mouse, microphone, touch-type or non-touch-type display device, joystick, and/or other devices (e.g., switches, immersive head set, etc.) that enable input and/or output by an operator. In some embodiments, the controller 22 may provide feedback of any automatic adjustment in stepper motor settings to the operator via the user interface 52.

FIG. 5B further illustrates an example embodiment of the controller 22. One having ordinary skill in the art should appreciate in the context of the present disclosure that the example controller 22 is merely illustrative, and that some embodiments of controllers may comprise fewer or additional components, and/or some of the functionality associated with the various components depicted in FIG. 5B may be combined, or further distributed among additional modules, in some embodiments. It should be appreciated that, though described in the context of residing in the strap drive control apparatus 10 (FIG. 1), in some embodiments, the controller 22, or all or a portion of its corresponding functionality, may be implemented in a computing device or system located external to the strap drive control apparatus 10. Referring to FIG. 5B, with continued reference to FIG. 5A, the controller 22 or electronic control unit (ECU) is depicted in this example as a computer, but may be embodied as a programmable logic controller (PLC), field programmable gate array (FPGA), application specific integrated circuit (ASIC), among other devices. It should be appreciated that certain well-known components of computers are omitted here to avoid obfuscating relevant features of the controller 22. In one embodiment, the controller 22 comprises one or more processors (also referred to herein as processor units or processing units), such as processor 60, input/output (I/O) interface(s) 62, and memory 64, all coupled to one or more data busses, such as data bus 65. The memory 64 may include any one or a combination of volatile memory elements (random-access memory RAM, such as DRAM, and SRAM, etc.) and nonvolatile memory elements (e.g., ROM, Flash, hard drive, EPROM, EEPROM, CDROM, etc.). The memory 64 may store a native operating system, one or more native applications, emulation systems, or emulated applications for any of a variety of operating systems and/or emulated hardware platforms, emulated operating systems, etc.

In the embodiment depicted in FIG. 5B, the memory 64 comprises an operating system 66 and stepper motor software 68. It should be appreciated that in some embodiments, additional or fewer software modules (e.g., combined functionality) may be deployed in the memory 64 or additional memory. In some embodiments, a separate storage device may be coupled to the data bus 55, such as a persistent memory (e.g., optical, magnetic, and/or semiconductor memory and associated drives).

The stepper motor software 68 uses a formula to determine from the spool diameter D what the effective spool diameter D' is at any given time from feedback from the stepper motor encoder 48. The initial spool diameter D is an operator entered parameter that is entered using the user interface 52 and stored in memory 64. In addition, if the spool 20 is pulling just one side of the strap 16, after each revolution of the spool 20, the diameter D' changes by two strap thicknesses T. If the spool 20 is pulling the strap 16 from both sides, after each revolution of the spool 20, the diameter D' changes by four strap thicknesses T. Accordingly, the operator must input a parameter regarding if the spool 20 is pulling in one direction or both directions using the user interface 52 and stored in memory 64. Using all of these operator entered parameters, the stepper motor software 68 determines the speed to run the stepper motor 18 to achieve constant speed of the strap 18 and ventilation control members 12. It is also desirable that the operator be able to enter a desired strap speed. For example, the operator may provide input to the controller 22 so that the strap speed can be selected from a speed range of between 3 inches per minute to 36 inches per minute. Additionally, it is desirable that the controller 22 automatically adjust the strap speed downward if the controller 22 receives input that there is insufficient power to retract the strap 16 at the requested speed.

The stepper motor software 68 receives encoder input from the encoder 48 to determine how many wraps of the strap 16 there are around the spool 20. The stepper motor software 68 processes the inputs to derive an adjustment value or values to communicate to the stepper motor 18. The stepper motor software 68 may compare the values received from the operator input in a look up table (e.g., stored in memory 64) that associates the parameters to a respective adjustment value. In some embodiments, the parameters are used in a formula that the stepper motor software 68 computes to derive an adjustment value. The stepper motor software 68 communicates the adjustment value via the I/O interfaces 62 to the stepper motor 18, which are used to cause an adjustment to the speed that the stepper motor 18 rotates the spool 20.

Execution of the stepper motor software 68 may be implemented by the processor 60 under the management and/or control of the operating system 66. The processor 60 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 22.

When certain embodiments of the controller 22 are implemented at least in part with software (including firmware), as depicted in FIG. 5B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 22 are implemented at least in part with hardware, such functionality may be implemented with any or a combination of the following technologies, which are all well-known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
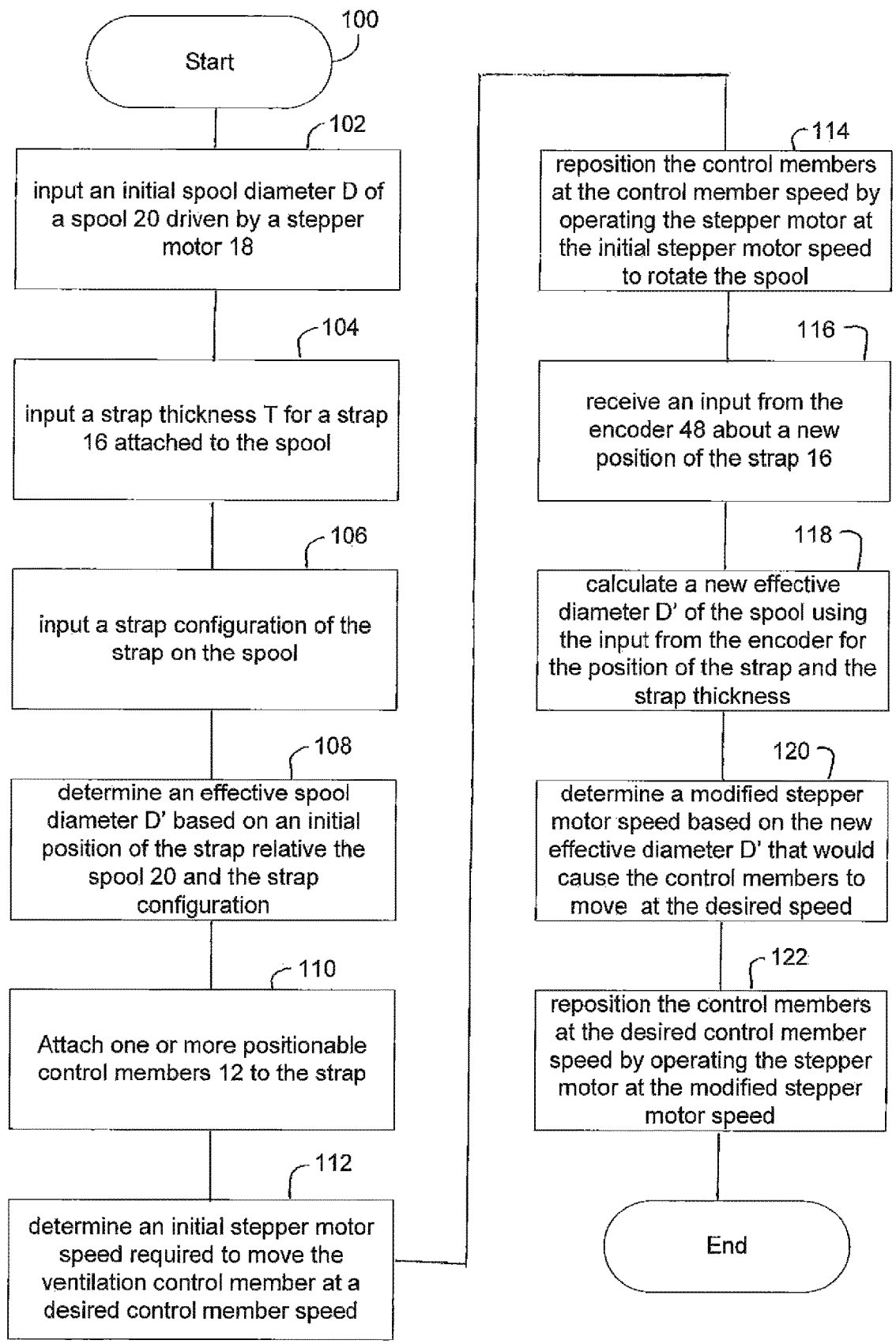
FIG. 6 is a flow diagram that illustrates an embodiment of an example method of operating the strap drive control apparatus.

In view of the above description, it should be appreciated that one embodiment of a track stepper motor method 100, depicted in FIG. 6 (and implemented in one embodiment by the control system 60, FIG. 5B), comprises an initial step of inputting an initial spool diameter D of a spool 20 driven by a stepper motor 18 at step 102. A strap thickness T of a strap 16 attached to the spool 20 is entered into the controller at step 104. A strap configuration of the strap 16 on the spool 20 is entered into the controller 22 at step 106. The controller 22 determines an effective spool diameter D' for the strap configuration and an initial position of the strap 16 relative the spool 20 at step 108. One or more positionable ventilation control members 14 are attached to the strap at step 110. The controller 22 determines an initial stepper motor speed for the stepper motor 20 required to move the one or more ventilation control members at a desired control member speed at step 112. The one or more ventilation control members 14 are repositioned by operating the stepper motor 18 at the initial stepper motor speed to rotate the spool 20 at step 114. The controller 22 receives an input from the encoder 48 about a new position of the strap 16 at step 116. A new effective diameter D' of the spool 20 is calculated using the strap position input from the encoder 48 and the strap thickness T at step 118. A modified stepper motor speed is determined based on the new effective diameter D' of the spool that would cause the stepper motor to move the one or more control members such that the one or more control members moves uniformly at the desired control member speed at step 120. The one or more control members is repositioned at the desired control member speed by operating the stepper motor at the modified stepper motor speed at step 122.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A method for operating a strap drive control apparatus used to position a ventilation control member in an animal facility, the method comprising:
   inputting an initial spool diameter of a spool driven by a stepper motor;
   inputting a strap thickness for a strap attached to the spool;
   inputting a strap configuration of the strap on the spool;
   determining an effective spool diameter based on an initial position of the strap relative the spool and the strap configuration;
   attaching one or more positionable control members to the strap;
   determining an initial stepper motor speed required to move the control member at a desired control member speed;
   repositioning the one or more control members at the control member speed by operating the stepper motor at the initial stepper motor speed to rotate the spool;
   receiving an input from an encoder about a new position of the strap;
   calculating a new effective diameter of the spool using the input from the encoder for the position of the strap and the strap thickness;
   determining a modified stepper motor speed based on the new effective diameter of the spool that would cause the stepper motor to move the one or more control members such that the one or more control members moves uniformly at the desired control member speed; and
   repositioning the one or more control members at the desired control member speed by operating the stepper motor at the modified stepper motor speed.

2. A ventilation control system for an animal facility, the ventilation control system having a movable ventilation control member mounted in an opening of the animal facility, the ventilation control member being movable relative the opening to control the amount of air that is able to pass through the opening, the ventilation control system also having a positioning strap attached to the ventilation control member, the strap having a strap thickness, and a strap drive control apparatus configured to control the positioning of the ventilation control members, wherein the strap drive control apparatus comprises:
   a rotating spool having an initial spool diameter;
   an electrically driven stepper motor to move the positioning strap by winding or unwinding the strap on the rotating spool;
   an encoder; and
   a controller configured to operate the stepper motor, the controller configured to:
      determine an effective spool diameter based on an initial position of the strap relative the spool;
      determine an initial stepper motor speed required to move the control member at a desired control member speed;
      reposition the control members at the control member speed by operating the stepper motor at the initial stepper motor speed to rotate the spool;
      receive an input from the encoder about a new position of the strap;

calculate a new effective diameter of the spool using the input from the encoder for the position of the strap and the strap thickness;

determine a modified stepper motor speed based on the new effective diameter of the spool that would cause the stepper motor to move the control member such that the control member moves uniformly at the desired control member speed; and reposition the control members at the desired control member speed by operating the stepper motor at the modified stepper motor speed.

3. The ventilation control system of claim 2 wherein the controller receives the initial spool diameter and the strap thickness.

4. The ventilation control system of claim 2 wherein the controller receives a strap configuration of the strap on the spool and determines the effective spool diameter based on an initial position of the strap relative the spool and the strap configuration.

* * * * *